May 13, 1969  HANS-JOACHIM WERNICKE  3,443,803
ROLLER ARRANGEMENT IN SEPARATING DEVICES
Filed July 5, 1966

United States Patent Office 3,443,803
Patented May 13, 1969

3,443,803
ROLLER ARRANGEMENT IN SEPARATING
DEVICES
Hans-Joachim Wernicke, Neuenhain, Taunus, Germany, assignor to Messer Griesheim G.m.b.H., Frankfurt am Main, Germany, a corporation of Germany
Filed July 5, 1966, Ser. No. 562,909
Claims priority, application Germany, July 16, 1965, M 65,984
Int. Cl. B23k 7/02, 37/04
U.S. Cl. 266—23    7 Claims

ABSTRACT OF THE DISCLOSURE

A roller arrangement for workpiece separating devices such as cutting torches which are moved longitudinally along with a workpiece and simultaneously across the workpiece, includes a set of stationary rollers for supporting the workpiece. Each roller is arranged with a gap and the gaps define the path taken by the separating means as it traverses completely across the workpiece.

---

Figures 1, 2:
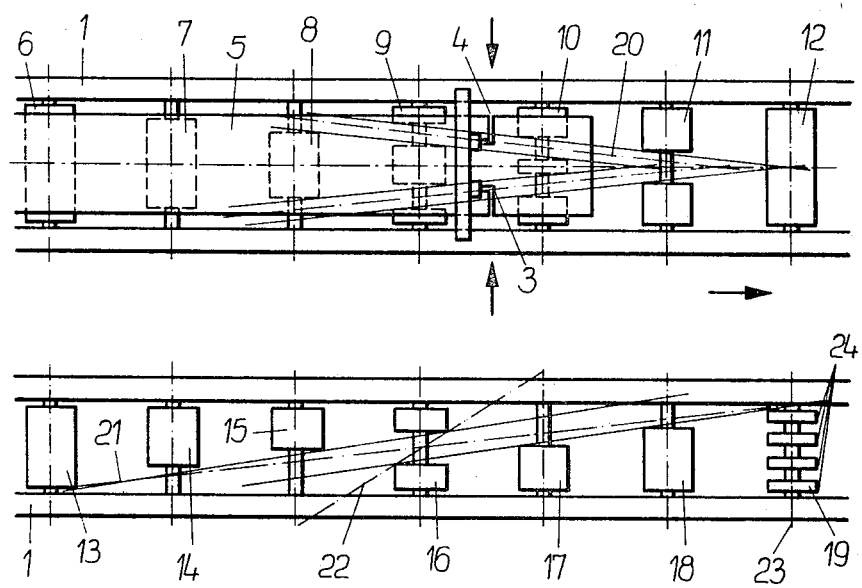

This invention relates to a roller arrangement or passage for devices for separating or cutting such materials as iron slabs, plates, or bands made of metal, synthetic material, or other material.

In continuous casting epuipment an elongated continuous piece is separated into individual workpieces of preselected length by means of a separating device, such as a cutting torch, during the movement of the continuous piece. This is usually done by moving the torch in the longitudinal direction at the same speed as the piece. Thus there is no relative movement in this direction between the torch and the piece. While the torch is moving longitudinally, it is also moving across the piece to cut the moving piece. During this cutting operation the piece is being moved on rollers.

In conventional arrangements using cutting torches, there are two serious drawbacks. Namely liquid slag is blown from the cutting nozzle and, in addition, a portion of the flame of the cutting beam is emitted from the nozzle. Slag and flames, in a repeated contact with the rollers upon which the workpiece rests would damage the rollers if special precautions for the protection of the rollers were not met.

In this connection, it is known to lower the rollers as soon as the cutting torch nears a roller, so that at least the cutting torch flame would not damage the roller. It is further known from DAS 1,208,850 (German published application) to place the workpieces on a roller chain, with which the cutting torch moves simultaneously in a synchronized manner, and which moves at the same speed as the continuous piece. The cutting torch thus is always located in an open space between two rollers, so that they do not encounter slag to a large extent. According to this type of construction, considerable constructive waste is necessary in order to carry out the downward or reverse movement. Furthermore, the lowered rollers are not easily protected from the falling residual pieces.

It is further known from DAS 1,180,604 to employ a hot iron saw for the separation of the rolled stock being continuously brought forward, whereby the saw is guided, in a self-contained circular path, in such a manner that the saw blade which is always perpendicular to the direction of the material, is moved closer to the path of the material and is then again removed therefrom, and by deflecting the material in the passage of the circular saw blade, the cut is effected by means of a rotary tubular guide wheel provided with a groove.

An object of this invention is to provide an arrangement which overcomes the above indicated drawbacks.

A further object is to provide such an arrangement which permits the effective workpiece separation operation to take place while minimizing damage to the rollers.

The arrangement of this invention is used with a separating device which moves together with the workpiece. The workpiece in turn is moved over rollers which are not vertically movable. In accordance with this invention the effective length of at least some of the rollers is smaller than the width of the support path for the workpiece. Thus at each roller location there is an open space or gap in the support path. The gaps of successive rollers are so arranged as to form the path taken by the separation device as it moves along the workpiece. In other words as the separation device traverses the workpiece, it is always disposed over a gap in that particular roller. Thus, the roller surface on which the workpiece is supported, is not touched by the flame of the cutting torch or some other separating tool, and the slags, cuttings, etc., fall on the roller at a considerably lesser degree, since the free space between any two adjacent rollers is respectively greater and above all not on the support surface of the rollers.

The rollers can be made of solid or hollow material. With respect to large dimensions, it is suitable to form the diameter reduction of the rollers or gap by providing a space between disks of shorter length than the rollers, with the disks being adjustable on an axis supporting the rollers. The invention is equally applicable for individual separating tools, which act on a lateral edge of the workpiece and are moved transversely across or through the workpiece, as well as for separating devices which operate with two countercurrently moved workpieces.

In addition to the already mentioned acetylene torches and saws, there can be used plasmic torches, files, electron beams, ultrasonic tools, liquid and gas jets of high velocity, etc.

In order to protect the basis of the part of the roller, which forms the diameter reduction (i.e. the roller shaft), against slags, cuttings, etc., these surfaces are provided, according to a further proposal of the invention, with preferably a removable abrasion covering which can be replaced after a certain amount of wear. This covering can consist of copper, for example.

Novel features and advantages of the present invention will become more apparent to those skilled in the art from a reading of the following description in conjunction with the accompanying drawings wherein similar reference characters refer to like parts and in which:

FIGURE 1 is a plan view of a roller arrangement used with a single cutting torch as the separating tool in accordance with this invention; and FIGURE 2 is a plan view of a corresponding roller arangement used with two countercurrently moved cutting torches.

As shown in FIG. 1, a number of rollers are supported in the roller passage housing 1. Roller 13 is constructed without a recess or gap and is located at the beginning of the tool passage 21. Since roller 13 is at the start of the torch movement, the torch has not yet cut through the workpiece and thus will not damage roller 13. Rollers 14–18 are always provided with a recess or gap whose length and position depends on the course or path 21 of the tool. These rollers 14–18 can be either solid or hollow. Alternatively, they can be replaced by rollers 19, which carry disks 24 arranged to be adjustable on an axis 23. Disks 24 are adjusted in such a manner that each roller has the desired recess or gap for the tool passage. For example, in using a disk roller as roller 16, two disks 24 are moved to one side and two disks 24 are moved to the other side, so that the corresponding recess or gap results. Further adjustment may be had by varying the distance between the axes of adjacent rollers, as by one roller closer to another roller.

In FIGURE 2 the same principle as in FIGURE 1 is realized, with the distinction that rollers 8–10 are always provided with two recesses in order to carry the passages of the two cutting torches according to predetermined paths. As shown therein, roller 11 has only one recess, since at this point the cutting nozzles of the two cutting torches are united. In this case also the gaps can be formed by the corresponding disk rollers, such as disk 24 of FIG. 1.

Obviously many modifications and variations of this invention are possible in light of the above description. It is therefore to be understood that within the scope of the appended claims the invention may be practiced otherwise than as specifically described.

What is claimed is:

1. A roller arrangement for workpiece separating devices wherein separating means is moved longitudinally along with a moving workpiece and is simultaneously moved across the workpiece, comprising a set of stationary rollers, said rollers defining a workpiece supporting surface having a longitudinal axis, a gap being in a plurality of said rollers, and the gaps in adjacent rollers being aligned at an angle with respect to said longitudinal axis to form a path completely across the workpiece over support surface which the separating means travels when traversing the workpiece.

2. An arrangement as set forth in claim 1 wherein each of said rollers having said gaps comprise a plurality of movably disks mounted on the roller axis, said disks being lockable to form a gap between adjacent disks.

3. An arrangement as set forth in claim 1 wherein the distance between said rollers is adjustable.

4. An arrangement as set forth in claim 1 wherein each of said rollers is mounted on a shaft, said shafts being exposed at said gaps, and the exposed portions of said shafts being covered with a removable wear coating.

5. An arrangement as set forth in claim 1 wherein said rollers are provided with further aligned gaps to form a second path for additional separating means.

6. An arrangement as set forth in claim 1 in combination with a cutting torch which comprises said separating means, said rollers having said gaps being formed as movable disks mounted on roller shafts, said disks being lockable to leave a portion of each shaft exposed at its gap, the exposed portions of said shafts being covered with a removable wear coating, and said shafts being movable with respect to each other whereby the distance between adjacent rollers may be varied.

7. An arrangement as set forth in claim 1 wherein in substantially all of said rollers the gap is of less width than the supporting surface of its roller.

References Cited

UNITED STATES PATENTS

| 2,538,876 | 1/1951 | Meincke. | |
|---|---|---|---|
| 3,072,003 | 1/1963 | Sirugue | 83—436 X |
| 3,173,185 | 3/1965 | Bergling | 25—105 |

OTHER REFERENCES

Process Control and Automation, January 1958, vol. 5, pp. 22–24.

J. SPENCER OVERHOLSER, *Primary Examiner.*

EUGENE MAR, *Assistant Examiner.*